United States Patent [19]

Snyder

[11] Patent Number: 5,488,897
[45] Date of Patent: Feb. 6, 1996

[54] COOKING APPARATUS

[75] Inventor: Wayne C. Snyder, Cohutta, Ga.

[73] Assignee: Griller's World Inc., Dalton, Ga.

[21] Appl. No.: 241,001

[22] Filed: May 11, 1994

[51] Int. Cl.⁶ .................................................. A47J 37/07
[52] U.S. Cl. ............................... 99/445; 99/449; 99/425
[58] Field of Search ............................ 99/422, 425, 445, 99/444, 449; 219/445, 457, 458, 464

[56] References Cited

U.S. PATENT DOCUMENTS

| | | | |
|---|---|---|---|
| 1,644,255 | 10/1927 | Kercher et al. | 219/464 |
| 1,659,774 | 2/1928 | Hicks | 219/459 |
| 1,705,702 | 3/1929 | Backer | 219/445 |
| 1,729,673 | 10/1929 | Kercher et al. | 219/464 |
| 3,225,682 | 12/1965 | Savio | 99/446 |
| 3,842,726 | 10/1974 | Fautz | 99/425 |
| 4,032,750 | 6/1977 | Hurko | 219/464 |
| 4,146,943 | 4/1979 | Wertheimer et al. | 15/230.06 |
| 4,229,032 | 10/1980 | Murphy | 15/236.06 |
| 4,410,793 | 10/1980 | Fischer et al. | 219/464 |
| 4,432,334 | 2/1984 | Holt | 99/449 |
| 4,493,308 | 1/1985 | Hurley et al. | 99/445 |
| 4,598,634 | 7/1986 | Van Horn, II | 99/340 |
| 4,608,917 | 9/1986 | Faaborg | 99/340 |
| 4,848,816 | 7/1989 | Anderson | 15/236.08 |
| 4,979,440 | 12/1990 | Latour et al. | 99/445 |
| 5,105,725 | 4/1992 | Haglund | 99/446 |

FOREIGN PATENT DOCUMENTS

| | | |
|---|---|---|
| 458548 | 11/1949 | Italy . |
| 2220838 | 1/1990 | United Kingdom . |

OTHER PUBLICATIONS

Undated one page description of grill having the heading "Easy to Install".

Primary Examiner—David Scherbel
Assistant Examiner—Reginald L. Alexander
Attorney, Agent, or Firm—Kerkam, Stowell, Kondracki & Clarke; William L. Feeney

[57] ABSTRACT

A cooking apparatus uses a cooking grid having an upper surface with a series of parallel rails and parallel valleys. The cooking grid has a continuous upper surface such that juices and other drippings from food which is being cooked upon the upper surface cannot come into contact with a heat source such as an electrical heating element. The grid further prevents flame from striking the food disposed on the top of the grid. The heat source may be an electrical heat source disposed within the grid. Alternately, the heat source could be separated from the grid by air. Another alternative as the heat source as part of a heating assembly upon which the grid is disposed. A multi-finger utensil is used with the grid. The grid is made of sections with grease seals between them.

17 Claims, 5 Drawing Sheets

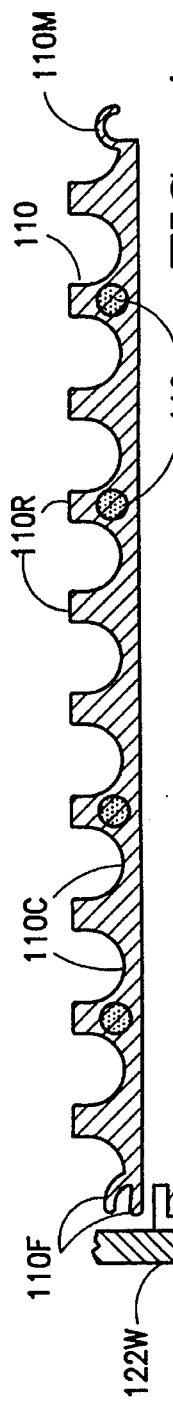
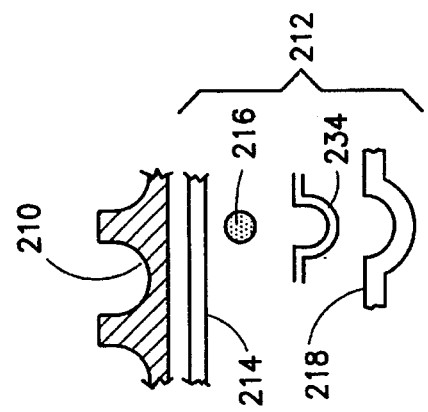
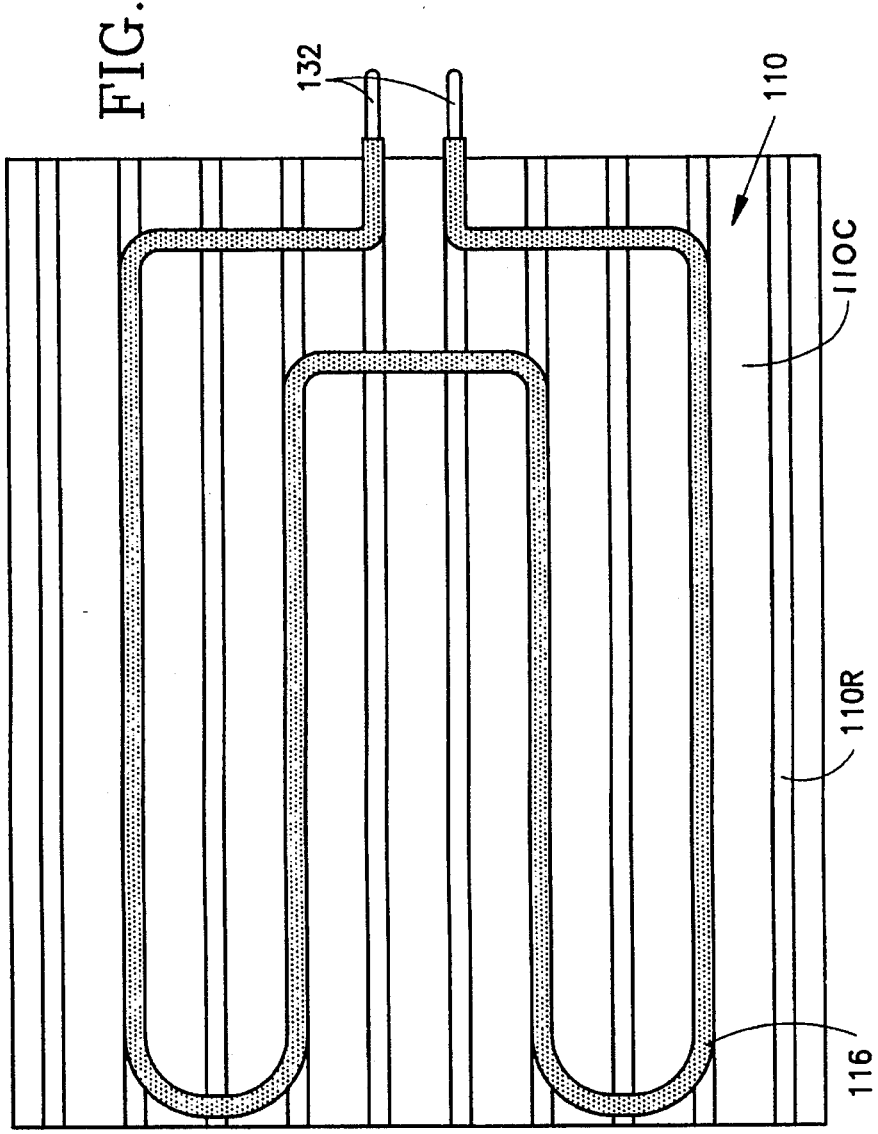

COOKING APPARATUS

BACKGROUND OF THE INVENTION

This invention relates to a cooking apparatus. More specifically, this invention relates to a cooking apparatus for the grilling of food.

Various devices have been used in the grilling of foods. Among other techniques, grilling may use gas heating or electric heating.

A gas heated cooking apparatus such as used domestically indoors or outdoors or for commercial grilling consists of an open flame burner or burners for heating the food. The food is in most cases held in place over the burner by an open wire or metal grill coated with porcelain or chrome to avoid rust. To reduce flare ups caused by grease fires, baffles of a variety of shapes have been suspended between the flame and the food. Although this may reduce the amount of flame coming in contact with the food or coming above the grill surface, such baffle techniques do not completely eliminate the potential fire hazard that can occur with a large grease fire. Such baffles reduce, but do not eliminate the potential carcinogens produced when animal fats come in contact with an open flame. It is generally believed that such contact between animal fats and an open flame produce carcinogenic pyrrolated hydrocarbons.

In addition to the problems of fire safety and production of carcinogens, gas grilling produces heat unevenly. This often creates hot spots that tend to burn and dry foods out at some locations. Also, because of the potential for excessively high temperatures that can occur, non-stick, easy-clean coatings often cannot be used on the grill or wire grid. This in turn makes it difficult to clean the grids as the grids are prone to have food stick to them. Such sticking problems associated with porcelain and chrome can make it quite difficult to grill fish and hamburger, among other types of food.

Electrical heating has also been used for grilling. Such arrangements usually have heat provided by a tubular electrical resistance heater such as the type commonly sold under the trademark CAL-ROD. The heater is placed below an open cooking wire grid similar to that used with gas units. Some designs use a reflector pan mounted just below the heating element in order to reflect some of the heat that would normally be wasted. Such heating elements normally must be run red hot for periods of time during the cooking cycle. When the element is red hot, animal fats coming into contact with the element will immediately burn. This may create the grease fire and carcinogenic hazards in the same general manner as discussed above. Further, such heating element arrangements may also have hot spots and uneven heating causing some foods or some parts of a food to dry and burn. Also, certain types of cooking devices such as barbecues can be operated only on 110 volts such that the heating is very slow and inefficient.

In addition to the above types of grilling, charcoal has been used for grilling food. Generally, the charcoal is disposed below an open wire grill or grid upon which the food is placed. Animal fats dropping from the food often cause the charcoal to flame up. This in turn produces the grease fire hazards and carcinogenic problems discussed.

Because of the fire hazards associated with grilling on the devices mentioned above, most condominiums or apartments along with municipalities forbid the use of these types of grilling devices.

In addition to the fire hazards discussed, animal fats generally produce smoke when coming into contact with heat sources that are normally in excess of 550° F. This eliminates the potential use of the grilling device indoors with the exception of relatively small smokeless devices. Some attempts have been made to produce larger grills that are smokeless by incorporating the electrical element into the cooking grid by using a die cast process. Generally, this cooking grid is in one piece and becomes very cumbersome to clean as they normally will not fit into most sinks and dishwashers.

OBJECTS AND SUMMARY OF THE INVENTION

Accordingly, it is a primary object of the present invention to provide a new and improved cooking apparatus.

A more specific object of the present invention is to provide a cooking apparatus having a non-stick, easy-clean cooking grid made up of two or more independent grid sections connected by a built in interlock that provides a grease seal where the grids are connected. This design makes it convenient to remove smaller grid sections for easier cleaning in a sink or dishwasher.

Another object of the present invention is to provide a cooking apparatus which eliminates grease fires and production of carcinogens.

Yet another object of the present invention is to provide a truly smokeless relatively large cooking grill with suitable temperatures controlled to a maximum of 550° F.

A further object of the present invention is to provide a cooking apparatus which avoids any contact between grease or drippings from the food being cooked and the heat source.

A still further object of the present invention is to provide a cooking apparatus which provides very uniform heating.

An additional object of the present invention is to maximize the use of heat typically produced by electricity by the grid design functioning as a heat exchanger and heat sink as well as a grilling surface.

A further additional object of the present invention is to include with the above mentioned grid system a non-stick coated improved spatula utensil that has been designed as an integral part of the grid system in order to provide the maximum protection for the non stick coating on the grids plus providing maximum ease in the removal of food such as fish, hamburgers, etc., by getting under the food without having to scrape the food from the contact surface as normally is done by a standard spatula. The improved spatula, combined with grid system also provides a new way to grill items, i.e., shrimp, stir fry, beef, chicken and vegetables.

The above and other features of the present invention are realized by a cooking apparatus including a generally horizontal cooking grid having an upper surface with a series of upwardly extending peaks separated by valleys, the peaks being at least ½ inch higher than a lowest level in the valleys, the upper surface having a heat portion. A heat source is below the heat portion for heating food on the upper surface, there being a heat source area of the upper surface including all of the heat portion and all parts of the upper surface which are between any parts of the heat portion. The heat source area is continuous throughout the heat source area such that, in operation, any grease or drippings from foods on the upper surface cannot reach the heat source. (As used herein, "continuous" means without any holes through which grease or drippings could pass.) Preferably, the grid includes at least first and second grid sections respectively having a first section connection edge and a second section connection edge connecting the first and second grid sections, the first and second connection edges sealing against dripping between the first and second grid sections. Each of the first and second connection edges has a raised ledge to block flow of food drippings between the first and second grid sections. The first and second connection edges lock the first and second grid sections together when the first and second grid sections are disposed in co-planar relationship and the first and second connection edges allow separation of the first and second grid sections when the first and second grid sections are moved out of co-planar relationship. The first connection edge has at least two edge portions extending lengthwise along the first connection edge with a curved cavity between the two edge portions, and wherein the second connection edge has a curved portion removably disposable with the curved cavity to lock the first and second grid sections together.

The upper surface is continuous within a solid area covering at least 90% of the upper surface.

In a first embodiment, the apparatus may further include a heating assembly disposed below a lower surface of the grid, the heat source being an electrical heat source within the heating assembly. The heating assembly further includes a heater plate to carry heat to the grid and a backing, the heat source disposed between the heater plate and the backing. An insulating film is between the electrical heat source and the backing and the backing is a backup plate and the electrical heat source is a mica thermofoil heater. The grid, heat plate, and backup plate are all made of aluminum.

In a second embodiment, the electrical heat source is a tubular or flat resistance heating element attached to a lower surface of the heater plate and the backing is a high temperature insulator.

In a third embodiment, a chamber has wall lined with high temperature insulating material, grid supports on the walls, and element support on the walls. The heating source is heating elements supported within the chamber by the element supports and the grid is supported above the heating elements by the grid supports.

The peaks are parallel rails and the valleys are parallel channels. The cooking apparatus may further include a utensil for manipulating foods on the grid, the utensil having a handle and at least 3 fingers, each finger having a width less than a distance between adjacent pairs of the peaks and the fingers being separated by a distance greater than a width of the peaks such that the 3 fingers are disposable simultaneously within separate of the valleys.

The present invention may alternately be described as a cooking apparatus including a generally horizontal cooking grid having an upper surface with a series of upwardly extending peaks separated by valleys, and wherein the grid has at least first and second grid sections having respective first section connection edges and second section connection edges connecting the first and second grid sections. The first and second connection edges seal against dripping between the first and second grid sections. Each of the first and second connection edges has a raised ledge to block flow of food drippings between the first and second grid sections. The peaks are parallel rails and the valleys are parallel channels, each of the rails being at least ½ inch high and no more than 1 and ½ inch high. The apparatus further includes a utensil for manipulating foods on the grid, the utensil having a handle and at least 3 fingers, each finger having a width less than a distance between adjacent pairs of the peaks and the fingers being separated by a distance greater than a width of the peaks such that the 3 fingers are disposable simultaneously within separate of the valleys.

The present invention may alternately be described as a cooking apparatus including a generally horizontal cooking grid having an upper surface with a series of upwardly extending peaks separated by valleys, and wherein the grid includes at least first and second grid sections respectively having a first section connection edge and a second section connection edge connecting the first and second grid sections, the first and second connection edges sealing against dripping between the first and second grid sections. The peaks are parallel rails and the valleys are parallel channels. The first connection edge has at least two edge portions extending lengthwise along the first connection edge with a curved cavity between the two edge portions, and the second connection edge has a curved portion removably disposable with the curved cavity to lock the first and second grid sections together. The upper surface has a heat portion. The apparatus further includes a heat source below the heat portion for heating food on the upper surface, there being a heat source area of the upper surface including all of the heat portion and all parts of the upper surface which are between any parts of the heat portion, the heat source area being continuous throughout the heat source area such that, in operation, any grease or drippings from foods on the upper surface cannot reach the heat source.

BRIEF DESCRIPTION OF THE DRAWINGS

The above and other features of the present invention will be more readily understood when the following detailed description is considered in conjunction with the accompanying wherein like characters represent like parts throughout the several views and in which:

FIG. 4 shows a front view of a second embodiment of grid according to the present invention;

FIG. 5 shows a top view of the grid of FIG. 4;

FIG. 7 shows an exploded view of the components of FIG. 6;

DETAILED DESCRIPTION

Figure 1:
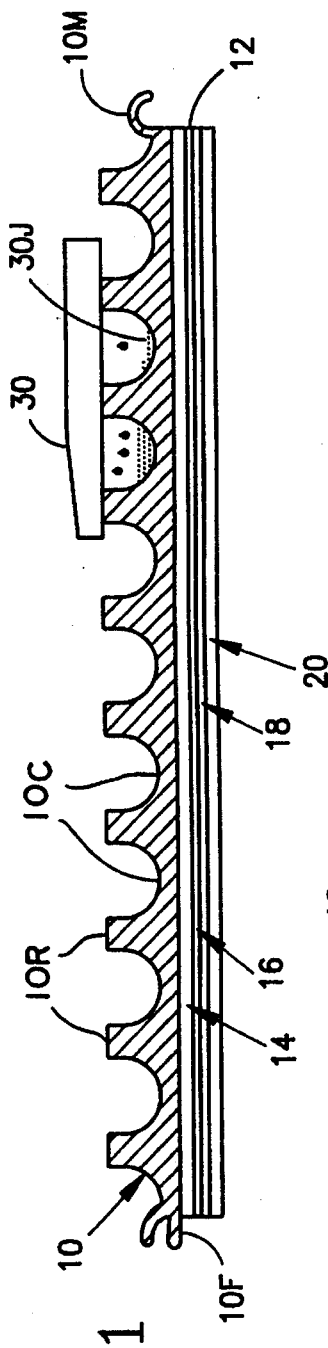
FIG. 1 shows a front view of a grid and heating assembly according to a first embodiment of the present invention.

As shown in FIG. 1, the cooking apparatus of the present invention includes an extruded or cast aluminum cooking grid 10. The cooking grid 10 includes a series of upwardly extending peaks such as parallel rails 10R, which rails are separated by a series of valleys constituted by parallel channels 10C. A male connector 10M is disposed along the right edge of the grid 10 and a female connector 10F is disposed along a left edge of the grid 10. The male connector 10M of one of the grids such as grid 10 may be connected to a female connector such as 10F of another grid (only one shown in FIG. 1) to provide a large heating surface than from a single grid. Note that the male connector 10M and the female connector 10F would preferably extend throughout opposite edges of the generally horizontal, rectangular grid 10.

Disposed just below and in contact with a lower surface of grid 10 is heating assembly 12 which is a generally sandwich-like structure having various rectangular layers. A top layer is an aluminum heater plate 14 which is just above a mica thermofoil heater 16. Below the thermofoil heater 16 is a ceramic insulating film 18. Below the film 18 is an aluminum backup plate 20. Each of these generally rectangular layers would be bolted (bolts not shown) or otherwise attached together to provide the heating assembly 12. If desired, either the backup plate 20 or the heater plate 14 could include vertically extending flanges into which the other of the aluminum plates would snap.

Advantageously, the grid 10, which may have multiple grid sections as discussed with respect to FIG. 10 below, is continuous over its full extent, meaning that it is without any holes through which grease or other drippings could pass. Specifically, the upper surface has a heat portion with the heat source below the heat portion, there being a heat source area of the upper surface including all of the heat portion and all parts of the upper surface which are between any parts of the heat portion. The heat source area is continuous throughout said heat source area such that, in operation, any grease or drippings from foods on said upper surface cannot reach said heat source. More generally, the upper surface is continuous within a solid area covering at least 90% of the upper surface. More preferably, the upper surface is continuous over a solid area of 95% of the upper surface. Each of the valleys or channels 10C is continuous over at least 90% of its length, preferably 95% of its length.

Figure 2:
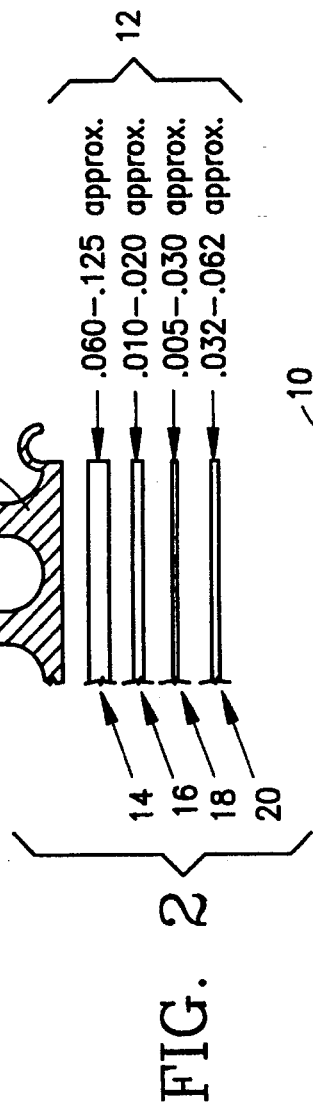
FIG. 2 shows an exploded view of the grid and heating assembly of FIG. 1.

FIG. 2 shows the grid 10 above the various layers of heating assembly 12 which are exploded. Additionally, FIG. 2 shows approximate thicknesses in inches for the various layers.

Figure 3:
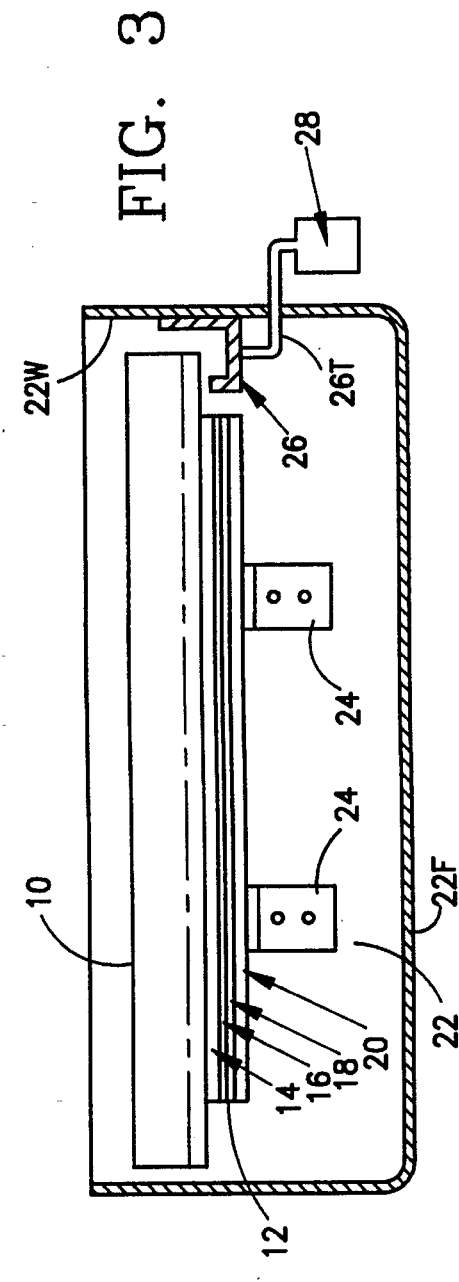
FIG. 3 shows a side view of the grid and heating assembly of FIG. 1 together with walls (some in cross section) of a chamber.

Continuing to consider FIGS. 1 and 2, but also turning now to FIG. 3, a chamber 22 has walls 22W and a floor 22F. Mounted to opposing walls of the chamber 22 are pairs of L brackets 24 (only one pair shown at one wall). The heating assembly 12 would be disposed generally horizontally upon the brackets 24, but would be sightly sloped towards the back of the unit (right side in FIG. 3) such that juices falling within the front-to-back parallel extending channels 10C (not separately shown in FIG. 3) of grid 10, which rests on assembly 12 and is slightly sloped as well, would generally flow toward a grease collector channel 26 mounted to the back one of the walls 22W. The grease channel 26 would be inclined so that grease would flow to a tube 26T for falling into a grease trap 28.

The arrangement of FIGS. 1–3 allows the grids to be coated with an easy clean non-stick coating. Since the grids are removable from the heater plate, they may be easily cleaned. The mica thermofoil heater and aluminum heater plate 14 provide fast and uniform heating. Any excess grease or juices from the food which is cooked will drain away from the heat source and eliminate any grease fires or smoke. The ceramic insulating foil or film 18 blocks heat loss, whereas the aluminum backup plate 20 keeps the assembly intact.

As shown in FIG. 1 only, food 30 would be placed along the peaks or rails 10R for cooking. Juices 30J drop into the channels where they simmer and produce vapors which enhance the flavor and moistness of the food. Most of the juices will eventually dry out on the surface of the grid after it has cooled and may be easily removed when cleaning the non-stick grid. Juices that don't dry out or excess juices would be drained into the grease trap as discussed above. Quite significantly, grease or cooking juices from any food on the upper surface of grid 30 cannot reach the heat source such as the thermofoil heater 16. Since the upper surface of the grid 10 is continuous (i.e., has no holes) throughout an area corresponding to the area in which the thermofoil heater is disposed, grease cannot get to the heat source. In the preferred design, the upper surface of grid 10 is continuous throughout its complete rectangular area. Assuming that the thermofoil heater 16 extends throughout the rectangular area of the heating assembly 12, the grid 10 would be continuous throughout that complete rectangular area. As shown in FIG. 3, grease on the grid 10 would simply flow towards the grease collecting channel 26 in view of the slightly backward slope in the channels 10C (channels not separately shown in FIG. 3).

The avoidance of grease getting to the heat source or otherwise becoming lodged in places where a grease fire would be possible is further facilitated by the interaction of male connectors 10M with corresponding female connectors 10F. In particular, the shape of the connectors provides a seal against grease or other juices dropping between two grids which might be connected together using the male connector 10M on one grid and the female connector 10F on the adjacent grid.

Turning now to the front view of FIG. 4 and the top view of FIG. 5, a second embodiment 110 having rails 110R and channels 110C is shown. The grid 110 is made of extruded or cast aluminum, has male connector 110M and female connector 110F at opposite edges, and may be otherwise constructed identically to grid 10 except as follows. Instead of using a heating assembly such as 12 of FIGS. 1 and 3, the arrangement of FIG. 4 and 5 uses a tubular electrical resistance heating element 116 as the heat source. The heating elements, which may be of the CAL-ROD type, would preferably be cast into the grid just below the rails. The aluminum of the grid 110 would provide uniform heating. As with the embodiment of FIGS. 1–3, greases would not come into contact with the heat source. The grid 110 might simply be disposed upon grid supports 130 (only one shown of a wall 122W shown in cross section and with parts broken away in FIG. 4 only. The grid 110 might be inclined towards the back of a chamber (not separately shown in FIG. 4) in similar fashion to FIG. 3 such that grease might flow into a grease channel such as 26 of FIG. 3. Instead of simply resting upon a heating assembly 12 of FIG. 3 as the grid 10 of FIG. 3 does, the grid 110 is mounted or supported directly by grid support brackets such as 130.

As shown in FIG. 5, the tubular heating element 116 may include quick disconnect ends 132 to allow removal of the control unit (not shown) from the heating element 116 and grid 110. This type of removal arrangement is generally well known in the field of cooking appliances.

Figure 6:
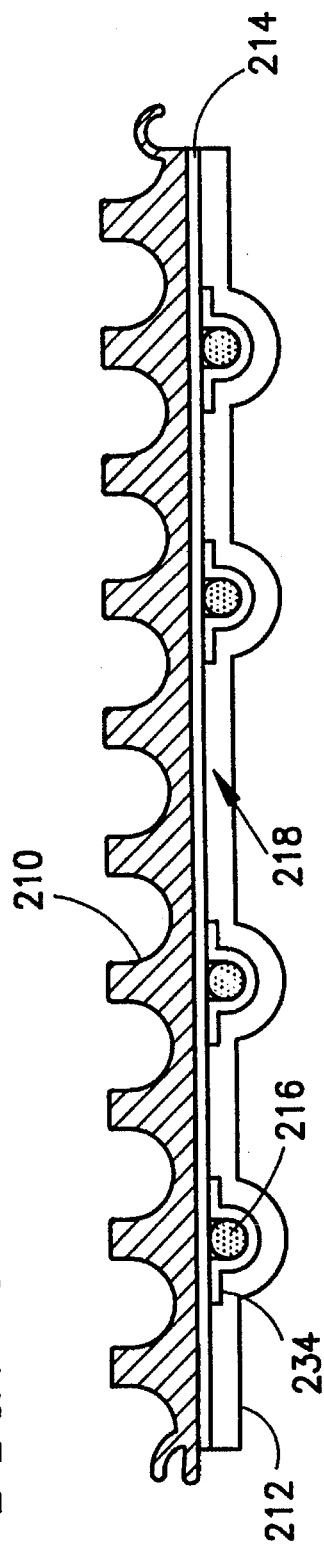
FIG. 6 shows a front view of a third embodiment heating assembly and grid according to the present invention.

Turning now to FIGS. 6 and 7, a third embodiment of the present invention will be described. This embodiment uses a grid 210 which is identical to the grid 10 of FIG. 1 and therefore need not be discussed in further detail. The grid 210 would simply be disposed upon a heating assembly 212 having an aluminum heater plate 214, a tubular electrical resistance heating element 216 (which may be constructed essentially identically to 116 of FIG. 5), and a high temperature insulator film or layer 18 disposed on the lower surface of the aluminum heater plate 214 and disposed to encapsulate the tubular heating elements 216. The tubular heating elements 216 would be attached to the heater plate 214 by a series of metal brackets 234. The insulator 218 may be a film of high temperature silicone, a mica sheet, mineral wool, or other suitable material.

The arrangement of FIG. 6 would provide the same advantages as discussed above in connection with the arrangement of FIG. 1. Specifically, the FIG. 6 arrangement would prevent any contact between food and juices of the food with the heating source. Further, it would prevent juices or drippings from the food becoming lodged in a location where they would catch fire. The heating assembly 212 of FIG. 6 could be mounted upon a chamber wall and have the grid 210 mounted on top of it in the same fashion as the structure of FIG. 3. The heating assembly 212 would have all its components attached together, whereas the grid 210 would simply sit on top of the heating assembly 212.

Figure 8:
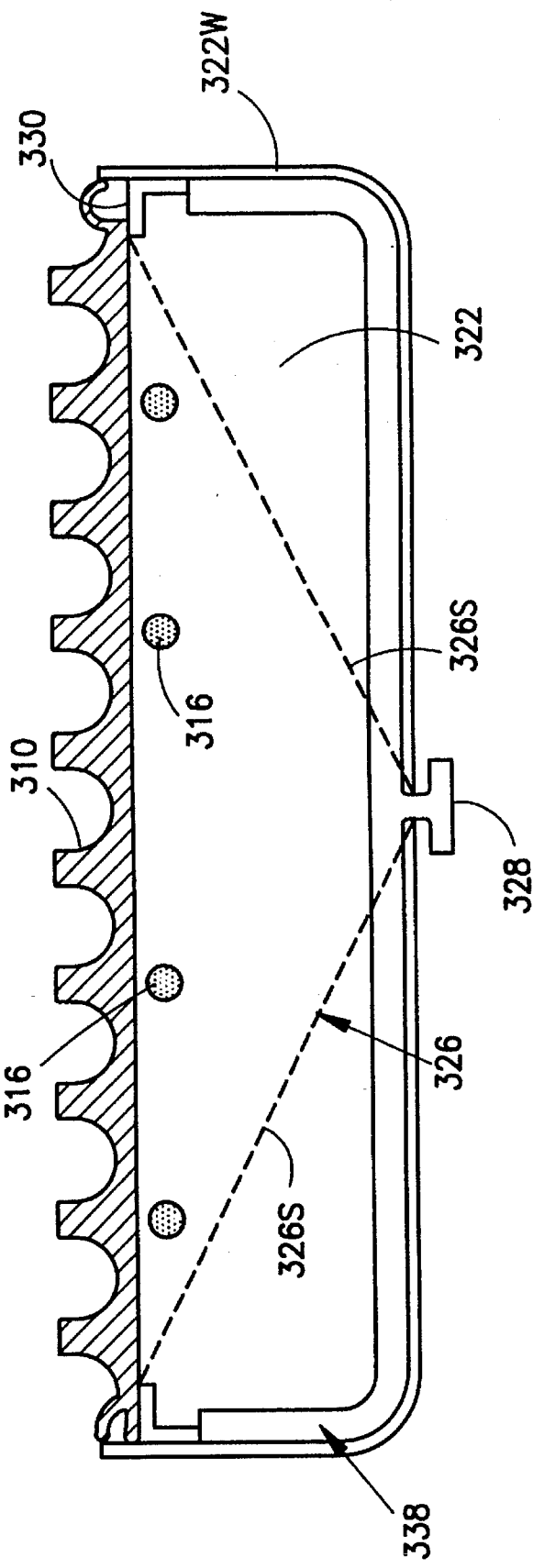
FIG. 8 shows a front view of a fourth embodiment of the present invention including a grid, heating elements, and chamber walls.
Figure 9:
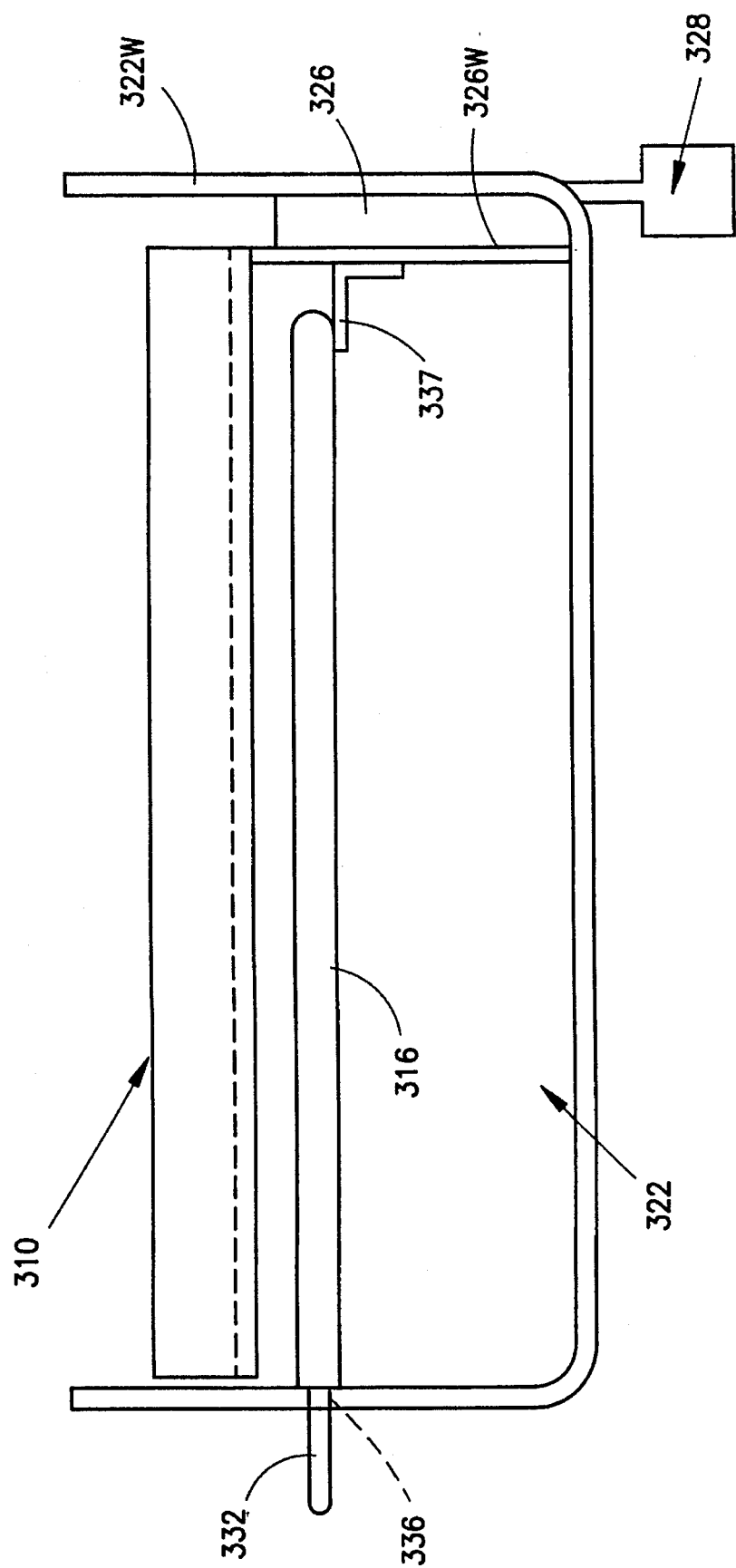
FIG. 9 shows a side view of the arrangement of FIG. 8.

Turning now to FIGS. 8 and 9, a fourth embodiment of the present invention will be discussed. The grid 310 of FIGS. 8 and 9 will be identical to the grid 10 of FIG. 1 and therefore need not be discussed in detail. The grid 310 sits upon grid supports 330 which are mounted to walls 322W of chamber 322. Tubular electrical resistance heating elements 316 are disposed in the chamber 322 and may follow a pattern identical to that illustrated for the heating element seen in the top view of FIG. 5. However, the heating element or elements 316 are simply mounted to have a quick disconnect 332 extend through holes 336 (only one visible, FIG. 9 only) in one of the walls 322W. Since the grid 310 and heat source 316 are separated by air, it will be readily appreciated that the grid 310 may be simply lifted off its supports and cleaned without moving the heat source 316. The two holes 336 (one for each quick disconnect end assuming element 316 has the same pattern as 116 of FIG. 5) serve as element supports, but one could optionally use other element supports such as bracket 337 (FIG. 9 only).

A high temperature insulating material 338 lines the inside of the chamber 322 to reduce any heat loss which might otherwise occur. The material 338 may be the same materials as discussed above in connection with the insulator 218 of FIG. 6.

As best shown in FIG. 9, a grease receptacle 326 is disposed at the back of the chamber 322 and separated from the chamber 322 by a wall 326W. The backward inclination of the grid 310 causes grease to drip into the grease receptacle 326 which has two inclined surfaces 326S (see FIG. 8) causing grease to flow into a grease trap 328.

As will be readily appreciated, the chambers such as chamber 322 of the present invention may be chambers of barbecue devices and may have walls constructed as with various known barbecue devices.

Although the heat sources for the present invention are primarily electric, gas or even charcoal might be employed in the broad aspects of the present invention by using ventilation techniques. In other words, one would have to have sufficient air flow to allow exhaust gases to exit to the side of a grid such as 320 and would have to have an arrangement to allow oxygen to be supplied to the gas heat source.

It should be noted that the electrical heat source of the various embodiments described allow efficient use of energy by isolating the areas where heat is not required. This isolation is accomplished by using insulation. This especially enables heat sources limited of 110 volts to provide increased heating capabilities to the cooking surface. It should also be mentioned that as a part of this invention, the controlled uniform distribution of heat to the cooking surface allows for the use of non-stick easy clean coatings that cannot normally be used in certain types of cooking apparatus such as barbecues.

If one wanted to have holes in the grid of the present invention, one might do so according to the broad teachings of the present invention provided that the holes in the grid (holes not shown) would be sufficiently horizontally displaced from the heat source such that no grease or drippings from the upper surface going through such holes could reach the heat source.

The present invention thus provides a grilling apparatus for indoor or outdoor use (including downdraft and updraft units, barbecue grills, etc.) where grease fires and flare ups are eliminated. Uniform heat is provided to the cooking surface and improved heat source efficiency are provided. Food cooking quality and flavor are improved. Larger cooking surfaces can be used even when limited to power sources of 110 volts. Ease in cleaning and elimination of carcinogens is provided by the present invention along with extended surface life of the coated surface from the incorporation of special spatula.

Figure 10:
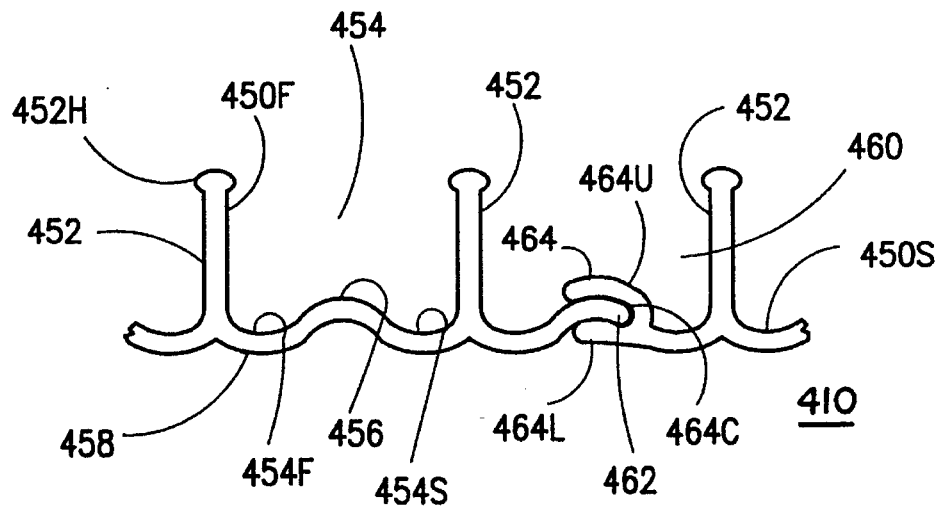
FIG. 10 shows a side view of another embodiment of parts of the invention with portions broken away illustrating two grid sections connected together.

FIG. 10 shows a cooking grid 410 made from identical first and second grid sections 450F and 450S respectively, both of which are shown only partially with portions broken away. In practice, each of the grid sections 450F and 450S would have numerous of the parallel rails 452 with parallel valleys 454 disposed between any two adjacent of the rails 452. As shown, each of the rails 452 may include a head portion 452H, which is slightly wider than the portion of the rail extending downwardly therefrom. As also shown, each of the valleys, such as the completely illustrated valley 454, has a central ridge 456 slightly higher than the identical first and second valley halves 454F and 454S. The valley halves 454F and 454S and the central ridge 456 extend lengthwise parallel to the rails 452 and perpendicular to the plane of view of FIG. 10. The underside 458 of the grid sections is curved in corresponding fashion to the valley half and central ridge 456 arrangement at the upper surface. Accordingly, heat transfer to the lower surface 458 will be increased, it being understood that heat may be transferred to this surface using any of the heating sources discussed in connection with the previous embodiments. Additionally, the double valley and central ridge arrangement for valley 454 increases the surface area from which heat may radiate to any food arranged on top of the rails 452. Advantageously, the distance between the peak of the rails 452 and the lowest point in the valleys will be at least one half inch and no more than one and one half inch. The minimum distance insures that grease or other drippings from food placed upon the tops of the rails 452 will not remain in contact with the food while it is being cooked. Instead, such drippings may flow down to a grease channel such as 26 of FIG. 3. As with the other embodiments described, the grid 410 of FIG. 10 would be disposed generally horizontally, but would have a slight inclination or tilt such that drippings may flow. Even non-flowing materials dropping off of the food are highly unlikely to remain in contact with the food up on the rails by virtue of the one half inch separation distance. Additionally, this distance serves to provide surface area from the sides of the rails 452, which surface area is used to efficiently transfer heat to food placed along the tops of the rails. This helps to solve a problem with transferring a sufficient amount of heat from electrical heating devices to food in order for efficient processing.

On the other hand, if the rails 452 had a height of greater than one and one half inches, the food would be so far separated from the floor of the valley 454 that this may lower the heat transfer efficiency to the food.

As shown also in FIG. 10, a valley 460 is disposed between the edge rails 452 of the first and second grid sections 450F and 450S. Advantageously, the valley 460 has an upper surface which is similar to the upper surface of the valley 454 such that it will provide similar heat transfer characteristics. However, extending along the center of valley 460 is the interface between the two grid sections. Specifically, a male edge 462 is disposed within a curved cavity 464C of a female edge 464. The female edge 464 has upper part 464U and lower part 464L with cavity 464C extending parallel to the rails 452 therebetween. As shown, 464C has curved upper and lower surfaces which match curves of upper and lower surfaces of the male edge 462. In the position of FIG. 10, the two grid sections are connected together. In order to disconnect them, first grid section 450F must be rotated counterclockwise relative to section 450S. This will allow the curves of male edge 462 to become free from being locked within the curves of the cavity 464C.

Advantageously, any grease falling within the valley 460 will initially be prevented from passing out through the interface between grid sections 450F and 450S by the fact that each of the edges has a raised ledge corresponding to parts 462 and 464U which prevents drippings from entering the cavity 464C. In the event that sufficient drippings occur as to raise the level to enter the small space between 464U and 462, such drippings are highly unlikely to escape from the interface between the two grid sections. In particular, if a small amount of drippings gets into cavity 464C, it will tend to stay at the bottom of 464C and not flow up over the raised edge of 464L. Moreover, the tolerance of fit between male edge 462 and cavity 464C is sufficiently close that passage of drippings will be blocked. Further, any drippings which do get into the cavity will tend to dry out in the close confines of the edges. As such drippings dry out, they will tend to seal the interface and block flow of any drippings which remain in liquid form. Thus, the interface is self-sealing. Finally, since the grid sections are slightly inclined to allow grease and other drippings to drain, such drippings would only get through the interface between the grid sections in the unlikely event that a very high level of drippings remained above the top of 462 for a sufficient time for drippings to pass into cavity 464C, pass down to the bottom of cavity 464C, and pass up from the bottom of cavity 464C above the edge of 464L. The inclination of the grid makes it highly likely that the level of drippings will recede below the upper edge of 462 before any such leakage has occurred. Thus, the interface between the grids not only connects them together, but also provides a grease and other dripping seal arrangement.

Figure 11:
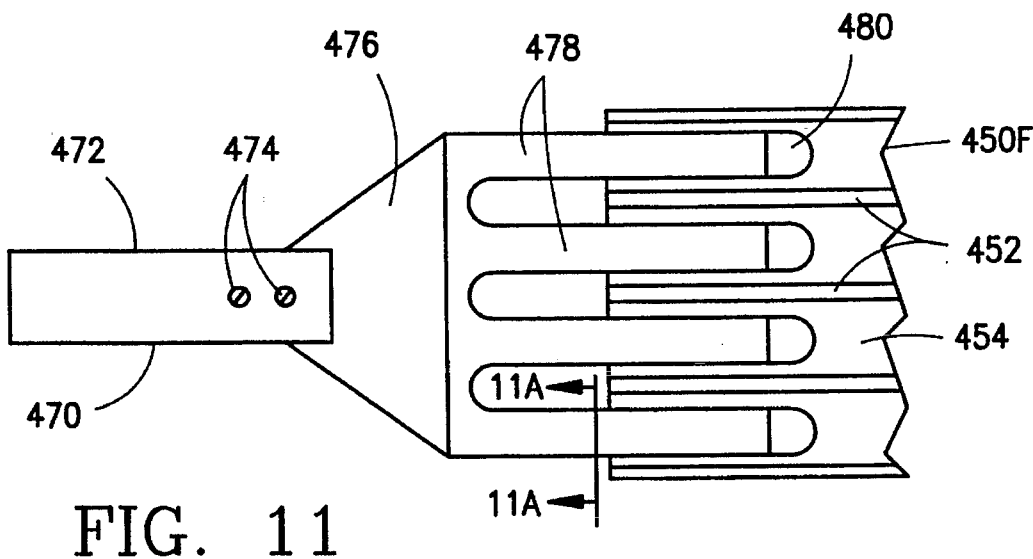
FIG. 11 shows a top view of a utensil according to the present invention with fingers of the utensil disposed in valleys of a grid section from FIG. 10.
Figure 12:
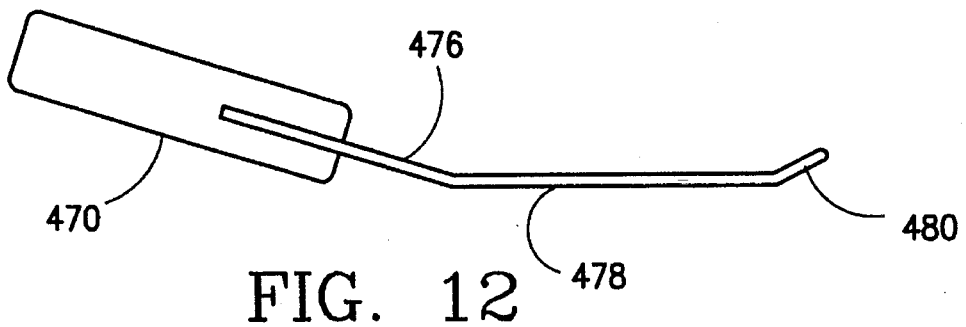
FIG. 12 shows a side view of the utensil of FIG. 11.

Turning now to FIGS. 11 and 12, a multi-finger spatula 470 according to the present invention will be discussed in detail. The spatula 470 includes a handle 472 with screws 474 (FIG. 11 only) holding the preferably wooden handle 472 to a metallic portion 476, preferably made of aluminum. The metallic portion 476 will preferably have a non-stick coating of PTFE. (Such non-stick coatings are sold under various trademarks including TEFLON and SILVERSTONE, among others.) It should be appreciated that the various embodiments of the grids as discussed above would likewise have such a coating.

Figure 11A:
FIG. 11A is a cross section view taken along line 11A—11A of FIG. 11.

As shown, the metallic portion 476 may include four fingers 478 (only two of which are numbered for ease of illustration). Although the preferred embodiment has four such identical fingers 478, the present invention contemplates that such a device could be made with three fingers or with more than four fingers. Each of the fingers 478 includes a rounded end 480 which is turned up from the plane in which the remainder of the fingers 478 are disposed. By having the tip of each finger turned up at portion 480 and by having rounded corners and edges on the fingers 478 and portion 480, any chances of the device 470 scratching any of the grids will be minimized. The rounded feature of the fingers 478 is illustrated by the cross section at FIG. 11A as taken along lines 11A—11A of FIG. 11.

As shown in FIG. 11, the fingers 478 fit between adjacent pairs of the peaks or rails 452. That is, each finger 478 has a width less than the distance between adjacent pairs of the peaks or rails 452. Additionally, the fingers 478 are separated by a distance greater than the width of the peaks or rails 452. Accordingly, the fingers are disposable simultaneously within separate of the valleys as illustrated in FIG. 11. Therefore, the fingers may be moved into the valleys below meat or other food which is resting upon the tops of the rails. The fingers may then be moved up and lift the food off the rails and be used to flip the food over to the other side.

The utensil 470 provides a new method for grilling items such as shrimp and stir fry items etc.

An important feature of the present invention is that those embodiments using electrical resistance to provide the heat are controlled such that the heat stays below 600° F. and, preferably, below 550° F. This will allow for smokeless cooking since grease and other food drippings are unlikely to be converted into smoke at those temperatures. Therefore, the present invention might well be used, depending upon a local fire code, in situations without the need for a relatively expensive ventilation system.

In addition to the feature of avoiding smoke, the present invention avoids having flames touch the food being cooked. Therefore, the negative consequences of fire touching the food, as discussed in detail above, will be avoided. Indeed, in the preferred embodiments where electrical resistance heating is used for cooking, there will be no flame whatsoever.

It should be appreciated that the utensil 470 could be utilized with any of the various grid designs disclosed in the present application.

Advantageously, the height of the rails or peaks 452 allows food to be cooked in an elevated fashion away from the meat juices. This may have health benefits in terms of a reduction of grease in the food which is consumed.

An important advantage of the various embodiments of the present invention having interlocking male and female edges is that the grid may be easily cleaned. In particular, the grid sections may be taken apart either by the rotation process described above or, possibly, by sliding one grid axially relative to the other grid in a lengthwise direction corresponding to the male and female edges. At any rate, once two or more grids sections have been separated, they would be of a convenient size to simply place within a dishwasher for automatic cleaning. In stark contrast, prior grid designs either rely upon a very large grid which may be difficult to clean in a typical dishwasher or upon grid sections which are easy to clean, but which do not seal out grease from leaking between them.

Although specific constructions and arrangements have been described herein, these are for illustrative purposes only. Various modifications and adaptations will be apparent to those of skill in the art. Accordingly, the scope of the present invention should be determined by reference to the claims appended hereto.

What is claimed is:

1. A cooking apparatus comprising a generally horizontal cooking grid having an upper surface with a series of upwardly extending peaks separated by valleys, said peaks being at least ½ inch higher than a lowest level in said valleys, said upper surface having a heat portion, and a heat source below said heat portion for heating food on said upper surface, all of said heat portion and all parts of said upper surface which are between any parts of said heat portion are continuous throughout such that, in operation, any grease or drippings from foods on said upper surface cannot reach said heat source, and wherein said grid comprises at least first and second grid sections respectively having a first section connection edge and a second section connection edge connecting said first and second grid sections, said first and second connection edges sealing against dripping between said first and second grid sections; and wherein each of said first and second connection edges has a raised ledge to block flow of food drippings between said first and second grid sections.

2. The cooking apparatus of claim 1 wherein said first and second connection edges lock said first and second grid sections together when said first and second grid sections are disposed in co-planar relationship and said first and second connection edges allow separation of said first and second grid sections when said first and second grid sections are moved out of co-planar relationship.

3. The cooking apparatus of claim 2 wherein said first connection edge has at least two edge portions extending lengthwise along said first connection edge with a curved cavity between said two edge portions, and wherein said second connection edge has a curved portion removably disposable with said curved cavity to lock said first and second grid sections together.

4. The cooking apparatus of claim 1 wherein each of said first and second connection edges has a raised ledge to block flow of food drippings between said first and second grid sections.

5. The cooking apparatus of claim 1 wherein said first and second connection edges lock said first and second grid sections together when said first and second grid sections are disposed in co-planar relationship and said first and second connection edges allow separation of said first and second grid sections when said first and second grid sections are moved out of co-planar relationship.

6. The cooking apparatus of claim 1 wherein said first connection edge has at least two edge portions extending lengthwise along said first connection edge with a curved cavity between said two edge portions, and wherein said second connection edge has a curved portion removably disposable with said curved cavity to lock said first and second grid sections together.

7. The cooking apparatus of claim 1 wherein said upper surface is continuous within a solid area covering at least 90% of said upper surface.

8. The cooking apparatus of claim 1 further comprising a heating assembly disposed below a lower surface of said grid, and said heat source being an electrical heat source within said heating assembly, said heating assembly further including a heater plate to carry heat to said grid and a backing, said heat source disposed between said heater plate and said backing.

9. The cooking apparatus of claim 8 wherein said heating assembly further includes an insulating film between said electrical heat source and said backing and wherein said backing is a backup plate and said electrical heat source is a mica thermofoil heater.

10. The cooking apparatus of claim 9 wherein said grid, heat plate, and backup plate are all made of aluminum.

11. The cooking apparatus of claim 8 wherein said electrical heat source is a tubular or flat resistance heating element attached to a lower surface of said heater plate and said backing is a high temperature insulator.

12. The cooking apparatus of claim 8 further comprising a chamber having walls lined with high temperature insulating material, grid supports on said walls, and element supports on said walls, said heat source is heating elements supported within said chamber by said element support and said grid supported above said heating elements by said grid supports.

13. The cooking apparatus of claim 1 wherein said peaks are parallel rails and said valleys are parallel channels.

14. A cooking apparatus comprising a generally horizontal cooking grid having an upper surface with a series of upwardly extending peaks separated by valleys, and wherein said grid comprises at least first and second grid sections having respective first section connection edges and second section connection edges connecting said first and second grid sections, said first and second connection edges sealing against dripping between said first and second grid sections, and wherein each of said first and second connection edges has a raised ledge to block flow of food drippings between said first and second grid sections.

15. The cooking apparatus of claim 14 wherein said peaks are parallel rails and said valleys are parallel channels, each of said rails being at least ½ inch high and no more than 1 and ½ inch high; and further comprising a utensil for manipulating foods on said grid, said utensil having a handle and at least 3 fingers, each finger having a width less than a distance between adjacent pairs of said peaks and said fingers being separated by a distance greater than a width of said peaks such that said 3 fingers are disposable simultaneously within separate of said valleys.

16. A cooking apparatus comprising a generally horizontal cooking grid having an upper surface with a series of upwardly extending peaks separated by valleys, and wherein said grid comprises at least first and second grid sections respectively having a first section connection edge and a second section connection edge connecting said first and second grid sections, said first and second connection edges sealing against dripping between said first and second grid sections, and wherein said peaks are parallel rails and said valleys are parallel channels, and wherein said first connection edge has at least two edge portions extending lengthwise along said first connection edge with a curved cavity between said two edge portions, and wherein said second connection edge has a curved portion removably disposable with said curved cavity to lock said first and second grid sections together.

17. The cooking apparatus of claim 16 wherein said upper surface has a heat portion; and further comprising a heat source below said heat portion for heating food on said upper surface, there being a heat source area of said upper surface including all of said heat portion and all parts of said upper surface which are between any parts of said heat portion, said heat source area being continuous throughout said heat source area such that, in operation, any grease or drippings from foods on said upper surface cannot reach said heat source.

* * * * *